United States Patent [19]

Dandreaux et al.

[11] Patent Number: 5,541,246
[45] Date of Patent: Jul. 30, 1996

[54] REPULPABLE HOT MELT ADHESIVES

[75] Inventors: Gary F. Dandreaux, Hackensack, N.J.; Erwin R. Ruckel, Wilton, Conn.

[73] Assignee: Arizona Chemical Company, Panama City, Fla.

[21] Appl. No.: 328,758

[22] Filed: Oct. 24, 1994

[51] Int. Cl.⁶ .................................................. C08L 91/06
[52] U.S. Cl. ...................... 524/272; 524/274; 524/275
[58] Field of Search .................................. 524/272, 274, 524/275

[56] References Cited

U.S. PATENT DOCUMENTS

| | | | |
|---|---|---|---|
| 2,098,222 | 1/1936 | Barnhart | 134/17 |
| 4,129,539 | 12/1978 | Fakla et al. | 260/27 |
| 4,131,581 | 12/1978 | Coker | 260/29.1 |
| 4,331,576 | 5/1982 | Colon et al. | 524/271 |
| 4,358,557 | 11/1982 | Boggs | 524/272 |
| 4,413,080 | 11/1983 | Blake | 524/187 |
| 4,522,967 | 6/1985 | Sheldon et al. | 524/377 |
| 4,618,640 | 10/1986 | Tsuchida et al. | 524/272 |
| 4,623,688 | 11/1986 | Flanagan | 524/377 |
| 4,681,576 | 7/1987 | Colon et al. | 604/361 |
| 4,769,406 | 9/1988 | Keithley | 524/100 |
| 4,822,653 | 4/1989 | Kauffman et al. | 428/34.2 |
| 4,895,567 | 1/1990 | Colon et al. | 604/361 |
| 4,994,516 | 2/1991 | Luvinh | 524/275 |
| 5,128,397 | 7/1992 | Horsey et al. | 524/290 |
| 5,143,961 | 9/1992 | Scholl et al. | 524/317 |
| 5,217,798 | 6/1993 | Brady et al. | 428/246 |
| 5,356,963 | 10/1994 | Kauffman et al. | 524/43 |
| 5,391,601 | 2/1995 | Teeters et al. | 524/270 |

OTHER PUBLICATIONS

H. Dahmane, "Repulpable Hot Melt Adhesives", *European Adhesives and Sealants*, p. 28 (Dec. 1992).

T. F. Kauffman, "Environmentally Conscious Hot–Melt Adhesives", *Tappi J.* 74:142–144 (1991).

PCT International Application WO 92 00,363 Abstract, "Water–dispersible, Hot–Melt Polyester–Based Adhesives and Their Uses", F. Bozich, Jan. 9, 1992.

B. J. Monachino, "A New Compatibilizing Agent for Hot Melt Adhesives", *TAPPI 1982 Paper Synthetics Conference*, pp. 303–311.

M. J. Satrumer, "Hot Melt Adhesives Manufacture and Applications", Noyes Data Corporation, Park Ridge, N.J., pp. 185–187 (1974).

G. Dougherty et al., "Hot Melt Adhesive", Defensive Publication 285,025, published Sep. 30, 1969.

Japanese Abstracts, "Aqueous Alkali–Soluble Hot Melt Adhesives," H. Nozawa et al., Japan Kokai Tokyo Koho JP 04 04,279 [92 04,279], Jan. 8, 1992.

*Primary Examiner*—Jeffrey T. Smith
*Attorney, Agent, or Firm*—Ostrager, Chong & Flaherty

[57] ABSTRACT

Repulpable, hot melt adhesives which are composed of approximately equal amounts of a tackifier (having an acid number greater than about 70) and a hydrophilic wax, with up to 9% of polymer. The hot melt compositions can contain up to 17% of polymer when the tackifier has a higher acid number of about 140.

10 Claims, No Drawings

REPULPABLE HOT MELT ADHESIVES

FIELD OF INVENTION

The field of the invention is hot melt adhesives which contain an ethylene-vinyl acetate type polymer as its polymeric component and which are also repulpable.

BACKGROUND OF THE INVENTION

Non-pressure sensitive, hot melt adhesives have many applications in the paper industry, including bookbinding, bag ending, and case and carton sealing. A non-pressure sensitive, hot melt adhesive based on an ethylene/vinyl acetate type polymer typically contains 30–40% polymer, 30–40% tackifying resin, and 20–30% wax.

When paper containing hot melt adhesives is recycled, hot melt adhesives typical of the prior art tend to liquify during repulping and adhere to the pulp, resulting in what is known in the industry as "stickies". H. Dahmane, "Repulpable Hot Melt Adhesives" *European Adhesives and Sealants*, page 28 (December 1992); T. F. Kauffman, "Environmentally Conscious Hot-Melt Adhesives" *Tappi J.* 74:142–44 (1991). Removing these clumps of adhesive and pulp increases the cost of paper recycling and residual adhesive reduces the quality of the resulting pulp. Also, adhesive deposit formation can lead to sheet breaks during the paper making process, thus leading to machine downtime.

Efforts to overcome this problem have included adding or replacing EVA type polymers with hydrophilic polymers. H. Dahmane, "Repulpable Hot Melt Adhesives", *European Adhesives and Sealants*, page 28 (December 1992); T. F. Kauffmann, "Environmentally Conscious Hot-Melt Adhesives", *Tappi J.* 74:142–144 (1991); S. L. Scholl et al., U.S. Pat. No. 5,143,961; J. N. Coker, U. S. Pat. No. 4,131,581; F. Brady et al., U. S. Pat. No. 5,217,798; "Aqueous Alkali-Soluble Hot Melt Adhesives," H. Nozawa et al., Japan Kokai Tokyo Koho JP 04 04,279 [92 04,279]; "Water-dispersible, Hot-melt Polyester-based Adhesives and their Uses," F. Bozich, PCT International WO 92 00363; A. S. Sheldon et al., U.S. Pat. No. 4,572,967. However, replacing the EVA type polymer weakens and reduces the durability of the hot melt formulation. The present invention has overcome the limitations of the prior art and describes hot melt formulations containing EVA type polymers that retain both adhesion and repulpability.

DISCLOSURE OF THE INVENTION

The repulpable, hot melt adhesives of the invention are composed of approximately equal amounts of a tackifier (having an acid number greater than about 70) and a hydrophilic wax, with up to 9% of polymer. The hot melt compositions can contain up to 20%, preferably 17%, of polymer when the tackifier has a higher acid number of about 140. When the acid number of the tackifier is lower, less polymer can be incorporated. The wax must be ethoxylated according to the present invention. The range of the components of the hot melt components that retain both adhesion and repulpability are: about 15 to 75 weight percent for the tackifier, 15 to 75 weight percent for the wax, and 4 to 20 weight percent for the polymer, such that the total adds up to 100%.

Repulpable, hot melt adhesives will allow paper mills and other users of hot melt adhesives to increase the amount of material which can be recycled. The formulations of the invention permit the use of conventional ethylene/vinyl acetate (EVA) type polymers instead of the new hydrophilic polymers, thereby maintaining the strength and toughness of the hot melt adhesive.

DETAILED DESCRIPTION OF THE INVENTION

Suitable tackifiers for use in the invention are any acid functionalized rosin derivative such as but not limited to rosin, polymerized rosin, disproportionated rosin, hydrogenated rosin, high acid number rosin ester, maleic acid modified rosin, fumaric acid modified rosin. The acid number of the tackifier should be greater than about 70. Other tackifiers include those based on terpenes, $C_5$ hydrocarbons, $C_9$ (aromatic) hydrocarbons, $(C_5)_2$ hydrocarbons (such as dicyclopentadiene), modified so that the acid number is greater than about 70. For example, non-aromatic carbon-carbon double bonds in the tackifiers can be reacted with maleic anhydride via the "ene" and/or Diels-Alder reaction and then hydrolysed to provide the requisite acidity (See B. C. Trivedi et al., *Maleic Anhydride*, chaps. 4 and 5, Plenum Press, New York, 1982). A particularly preferred tackifier is Sylvatac® 140 polymerized rosin, which has a 140° C. softening point and acid number =140 (Arizona Chemical Company, Panama City, Fla.). Also suitable is Zonester® 65 rosin ester, 65° C. softening point, acid number=78, which is manufactured by Arizona Chemical. Zonester®85 rosin ester, softening point 82° C. and acid number=7 is included in the examples to demonstrate that a low acid number rosin ester will not lead to repulpability.

The wax can be chosen from the group of ethoxylated waxes. Unithox® 420 hydrophilic wax (HLB (hydrophile-lipophile balance)=4), melting point 91° C., and Unithox® 450 hydrophilic wax (HLB=10), melting point 91° C. (Petrolite Corporation, Tulsa, Okla.) are preferred waxes for use in the hot melt adhesives according to the invention.

The polymer can be chosen from the following polymers well known in the art: polyethylenes, ethylene/vinyl acetate copolymers, ethylene/ethyl acrylate copolymers, ethylene/acrylic acid copolymers, ethylene/methacrylic acid copolymers, ethylene/vinyl acetate/acid terpolymers and similar polymers derived from ethylene. Other polymers include atactic polypropylene, polyesters, and polyamides.

This invention can be further illustrated by the following examples of preferred embodiments, although it will be understood that these examples are included merely for purposes of illustration and are not intended to limit the scope of the invention unless otherwise specifically indicated.

EXAMPLE 1

Preparation of Hot Melt Adhesives

The components (polymer, tackifier, and wax) are stirred at a temperature of 160° C. until homogeneous. For the repulpablility experiments (Example 2), 1.0% by weight of a red organic soluble dye (Sudan III, Aldrich Chemical Company, Milwaukee, Wis.) was added to facilitate the visual inspection required in the repulping test.

The polymers for the adhesives tested were Elvax® 4310 ethylene/vinyl acetate/acid terpolymer (DuPont Corporation, Wilmington, Del.), which is characterized by 500 melt index, 25% vinyl acetate and an acid number=4–8, and Elvax® 210 ethylene/vinyl acetate copolymer (Dupont Corporation), which has a melt index of 400 and is 28% vinyl acetate. The tackifier used was either a Sylvatac® 140 polymerized rosin or a Zonester® 65 (or 85) rosin ester described in detail above.

In the hot melt adhesives according to the invention, Unithox® 420 and 450 hydrophilic waxes were used in a 50:50 mixture. Hot melt adhesives containing the hydrophilic waxes according to the invention were compared to hot melt adhesives containing a conventional wax such as Aristowax® 165 petroleum wax (Unocal Chemicals, Schaumburg, Ill.). The rosin ester mixed with the conventional wax is a conventional rosin used in hot melt adhesives, Zonester® 85, acid number=7.

The parts by weight of each component of the hot melt adhesive formulations is shown in parentheses in Table 1. 0.2 to 0.8 parts by weight of the polymer is combined with a 50/50 blend of the wax and the tackifier to be tested.

EXAMPLE 2

Repulpability Test

To test repulpability, a 5 mil thick film is prepared on each of two sheets of lined notebook paper by pouring the molten adhesive (160° C.) to be tested onto the paper and drawing with a film applicator. The total weight of the adhesive on the two sheets of paper is about 2.5 g. More untreated notebook paper is added to bring the total weight of the paper and adhesive to about 22 g. The paper is cut into approximately 1"×3" strips and added to a blender containing 600 ml water, pH 9.3 at 60° C. (The pH 9.3 buffer was prepared by adding 6.3 g sodium bicarbonate and 150 ml 0.1 N NaOH to 3 liters of distilled water.) The blender (Custom Waring® blender) is then run at the high setting for 2.5 minutes. At the end of that period the temperature is 65–68° C. The temperature is allowed to cool to 60° C. and the blending step is repeated. The blend/cool sequence is performed a total of 5 times. The pulp is filtered with a Buchner funnel and the pulp cake is inspected for particles. If there are no dyed adhesive particles present, the adhesive is deemed repulpable; if there are particles present, the adhesive is not repulpable. The results of the repulpability testing are presented in Table 1 below.

In the first set of data in Table 1 (the first four entries), progressively greater amounts of Elvax® 4310 are added to a 0.5/0.5/1.0 Unithox® 420/Unithox® 450/Sylvatac® 140 blend. All of those mixtures demonstrate good adhesion to paper. At least 17% Elvax® 4310 can be added while still retaining repulpability. The results are the same when Elvax® 4310 is replaced by Elvax® 210, as shown in the second set of data. The third set of data demonstrates the repulpability of adhesives based on Zonester® 65. The results can be contrasted with those obtained for the adhesives in the last set of data (last four entries) which are made of more traditional hot melt components; none of the conventional adhesives are repulpable.

TABLE 1

REPULPABILITY DATA

| POLYMER | WAX | TACKI-FIER | REPULP-ABLE | ADHE-SION |
|---|---|---|---|---|
| Elvax ® 4310 (0.2) | Unithox ® 420 (0.5) Unithox ® 450 (0.5) | Sylvatac ® 140 (1) | YES | GOOD |
| Elvax ® 4310 (0.4) | Unithox ® 420 (0.5) Unithox ® 450 (0.5) | Sylvatac ® 140 (1) | YES | GOOD |
| Elvax ® 4310 (0.6) | Unithox ® 420 (0.5) Unithox ® 450 (0.5) | Sylvatac ® 140 (1) | NO | GOOD |
| Elvax ® 4310 (0.8) | Unithox ® 420 (0.5) Unithox ® 450 (0.5) | Sylvatac ® 140 (1) | NO | GOOD |
| Elvax ® 210 (0.2) | Unithox ® 420 (0.5) Unithox ® 450 (0.5) | Sylvatac ® 140 (1) | YES | GOOD |
| Elvax ® 210 (0.4) | Unithox ® 420 (0.5) Unithox ® 450 (0.5) | Sylvatac ® 140 (1) | YES | GOOD |
| Elvax ® 210 (0.6) | Unithox ® 420 (0.5) Unithox ® 450 (0.5) | Sylvatac ® 140 (1) | NO | GOOD |
| Elvax ® 210 (0.8) | Unithox ® 420 (0.5) Unithox ® 450 (0.5) | Sylvatac ® 140 (1) | NO | GOOD |
| Elvax ® 4310 (0.2) | Unithox ® 420 (0.5) Unithox ® 450 (0.5) | Zonester ® 65 (1) | YES | FAIR |
| Elvax ® 4310 (0.4) | Unithox ® 420 (0.5) Unithox ® 450 (0.5) | Zonester ® 65 (1) | NO | FAIR |
| Elvax ® 4310 (0.6) | Unithox ® 420 (0.5) Unithox ® 450 (0.5) | Zonester ® 65 (1) | NO | POOR |
| Elvax ® 4310 (0.8) | Unithox ® 420 (0.5) Unithox ® 450 (0.5) | Zonester ® 65 (1) | NO | NO |
| Elvax ® 4310 (0.2) | Aristowax ® 165 (1) | Zonester ® 85 (1) | NO | GOOD |
| Elvax ® 4310 (0.4) | Aristowax ® 165 (1) | Zonester ® 85 (1) | NO | GOOD |
| Elvax ® 4310 (0.6) | Aristowax ® 165 (1) | Zonester ® 85 (1) | NO | GOOD |
| Elvax ® 4310 (0.8) | Aristowax ® 165 (1) | Zonester ® 85 (1) | NO | GOOD |

The invention is described in detail with particular reference to preferred embodiments, but it will be understood that variations and modifications can be made within the spirit and scope of the invention.

We claim:

1. A repulpable, hot melt adhesives composed of:
   15.0% to 75.0% by weight of a tackifier having an acid number greater than about 70;
   15.0% to 75.0% by weight of a hydrophilic wax; and
   up to 9% by weight of a water insoluble polymer selected from the group consisting of polyethylenes, ethylene/vinyl acetate copolymers, ethylene/ethyl acrylate copolymers, ethylene/acrylic acid copolymers, ethylene/methacrylic acid copolymers, ethylene/vinyl acetate/acid terpolymers, atactic polypropylene, polyesters, and polyamides,
   such that the total weight % of the tackifier, hydrophilic wax and polymer is 100%.

2. A repulpable, hot melt adhesive composed of:

15.0% to 75.0% by weight of a tackifier having an acid number of about 130 to about 170;

15.0% to 75.0% by weight of a hydrophilic wax; and up to 20% by weight of a water insoluble polymer selected from the group consisting of polyethylenes, ethylene/vinyl acetate copolymers, ethylene/ethyl acrylate copolymers, ethylene/acrylic acid copolymers, ethylene/methacrylic acid copolymers, ethylene/vinyl acetate/acid terpolymers, atactic polypropylene, polyesters, and polyamides, such that the total weight % of the tackifier, hydrophilic wax and polymer is 100%.

3. The repulpable, hot melt adhesive according to claim 1, wherein the tackifier is an acid functionalized rosin derivative selected from the group consisting of rosin, polymerized rosin, disproportionated rosin, hydrogenated rosin, high acid number rosin ester, maleic acid modified rosin, and fumaric acid modified rosin.

4. The repulpable, hot melt adhesive according to claim 1, wherein the tackifier is a compound selected from the group consisting of terpenes, $C_5$ hydrocarbons, $C_9$ (aromatic) hydrocarbons, and $(C_5)_2$ hydrocarbons, which has been modified to have an acid number greater than 70.

5. The repulpable, hot melt adhesive according to claim 2, wherein the tackifier is a polymerized rosin, having an acid number of 140 and a softening point of 140° C.

6. The repulpable, hot melt adhesive according to claim 1, wherein the hydrophilic wax is an ethoxylated wax.

7. The repulpable, hot melt adhesive according to claim 2, wherein the hydrophilic wax is an ethoxylated wax.

8. The repulpable, hot melt adhesive according to claim 1, wherein the polymer is an ethylene/vinyl acetate polymer.

9. The repulpable, hot melt adhesive according to claim 2, wherein the polymer is an ethylene/vinyl acetate polymer.

10. A repulpable, hot melt adhesive composed of:

1.0 part by weight of a tackifier having an acid number of about 130 to about 170;

0.5 part by weight of a hydrophilic wax having a HLB of about 4;

0.5 part by weight of a hydrophilic wax having a HLB of about 10; and 0.2 to 0.4 part by weight of an ethylene/vinyl acetate polymer.

* * * * *